United States Patent [19]

Shichida et al.

[11] 3,906,262

[45] Sept. 16, 1975

[54] TWO-AXIS MAGNETIC POSITIONING DEVICE

[75] Inventors: Hiromichi Shichida; Kenichi Toyoda; Seiji Irie, all of Hino, Japan

[73] Assignees: Fujitsu Ltd., Kanagawa; Fujitsu Fanuc Limited, Tokyo, both of Japan

[22] Filed: July 22, 1974

[21] Appl. No.: 490,661

[30] Foreign Application Priority Data
July 31, 1973 Japan.......................... 48-89980[U]

[52] U.S. Cl. ...................... 310/12; 310/13; 318/38; 318/135
[51] Int. Cl. ............................................. H02k 41/02
[58] Field of Search ............................... 318/35–38, 318/115, 135, 687; 310/12–14; 346/29

[56] References Cited
UNITED STATES PATENTS

| | | | |
|---|---|---|---|
| 3,268,747 | 8/1966 | Snowdon | 310/13 |
| 3,832,610 | 8/1974 | Shimizu et al. | 318/38 X |
| 3,851,196 | 11/1974 | Hinds | 310/12 |
| 3,857,075 | 12/1974 | Sawyer | 318/38 |
| 3,857,078 | 12/1974 | Sawyer | 318/135 X |

*Primary Examiner*—Donovan F. Duggan
*Attorney, Agent, or Firm*—Staas & Halsey

[57] ABSTRACT

A device for transferring an object on a horizontal plane in a first direction, in a second direction which crosses the first direction or in any direction between the first and second direction by making use of a pulse operated linear motor is referred to, wherein the device comprises a first member which moves in a first direction, a second member which moves in a second direction and which is located movably on the first member and a third member which is located movably on the second member and moves the object to be transferred.

5 Claims, 17 Drawing Figures

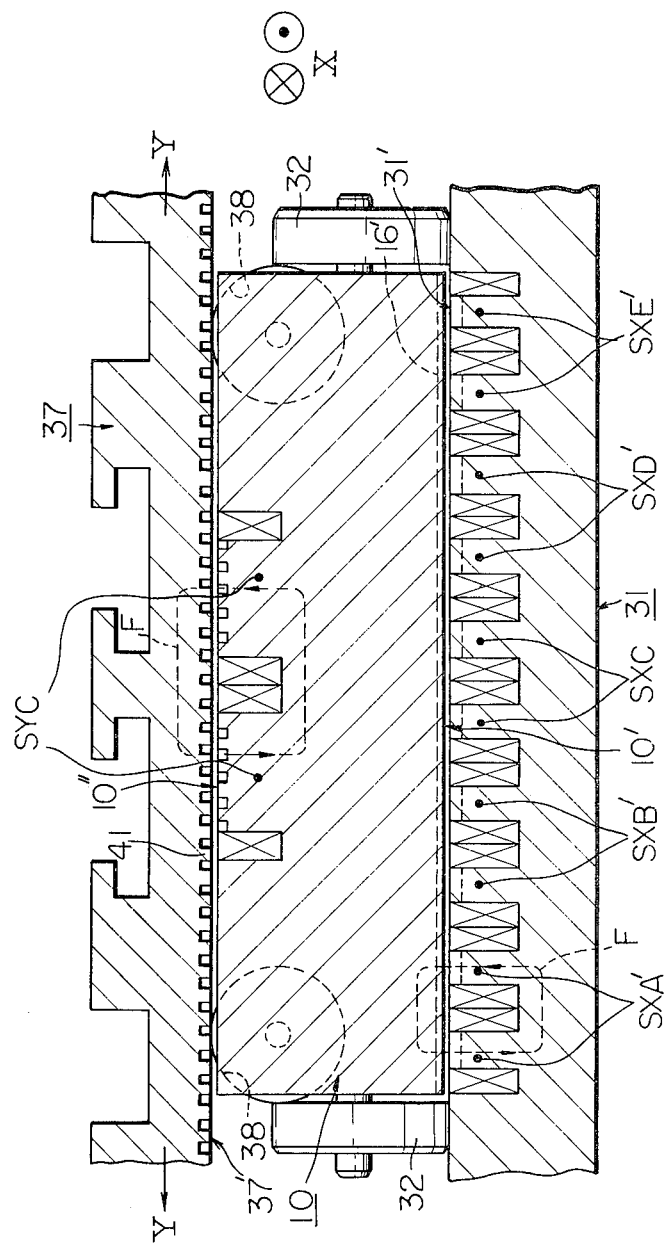

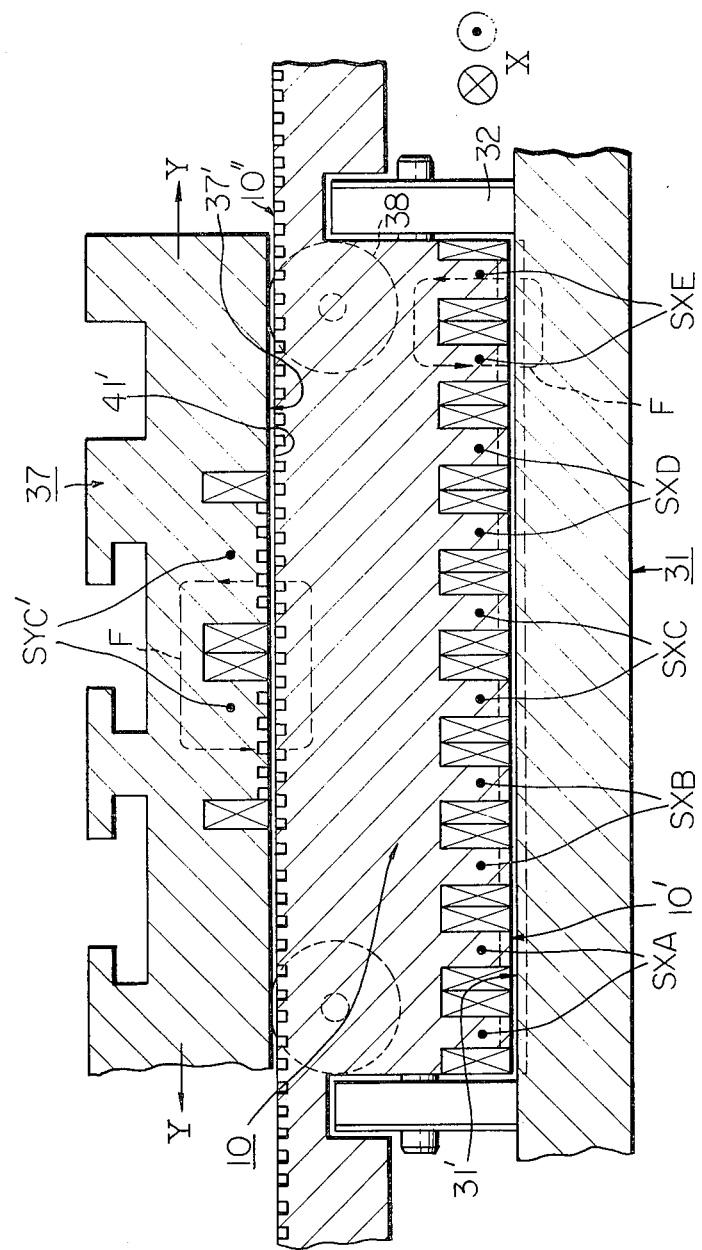

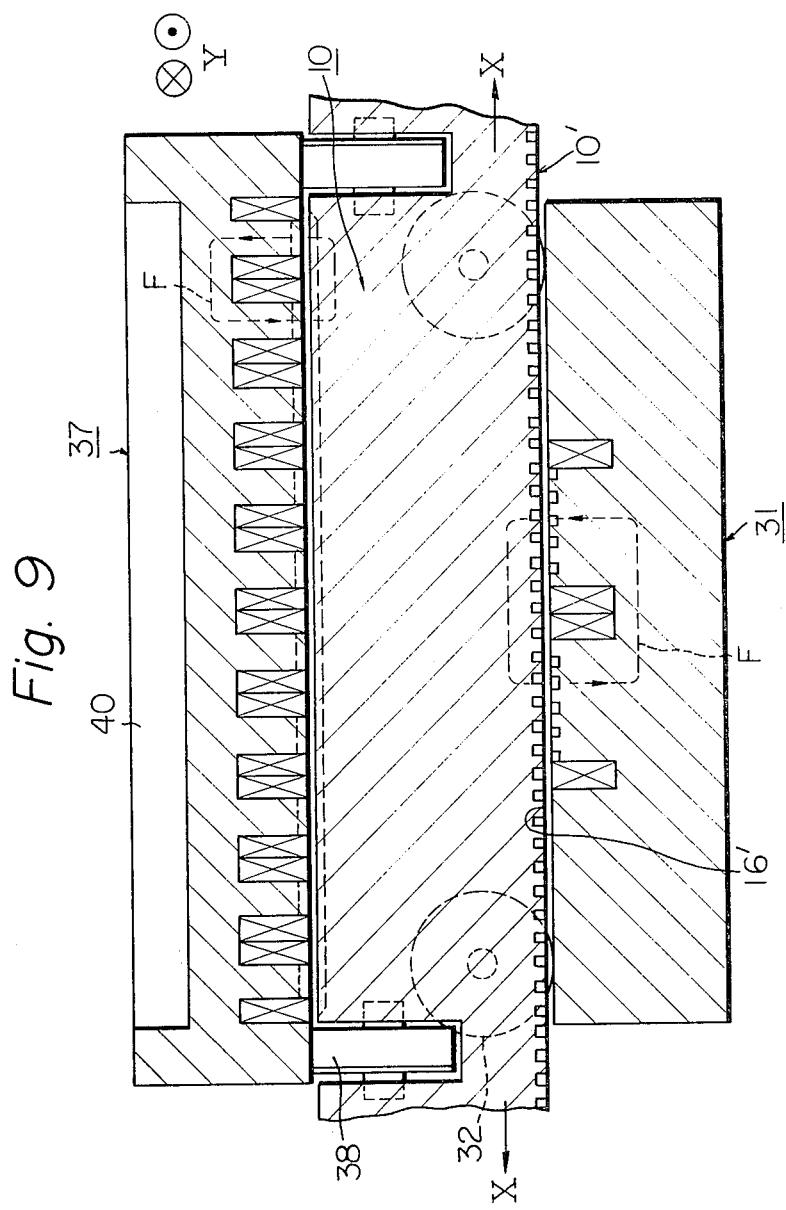

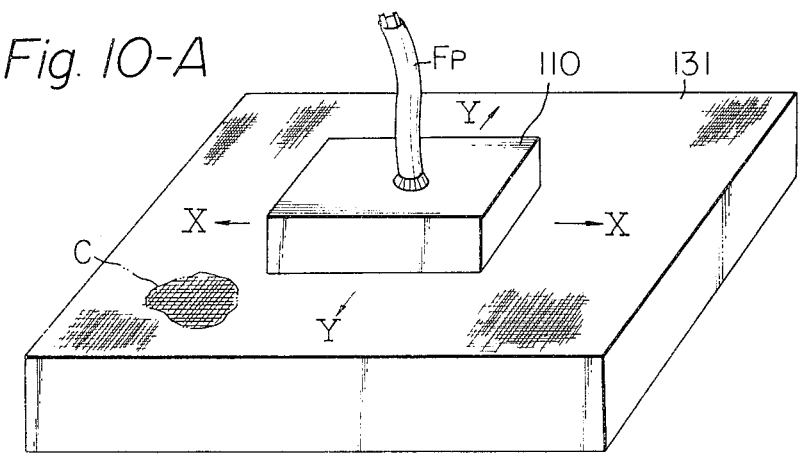
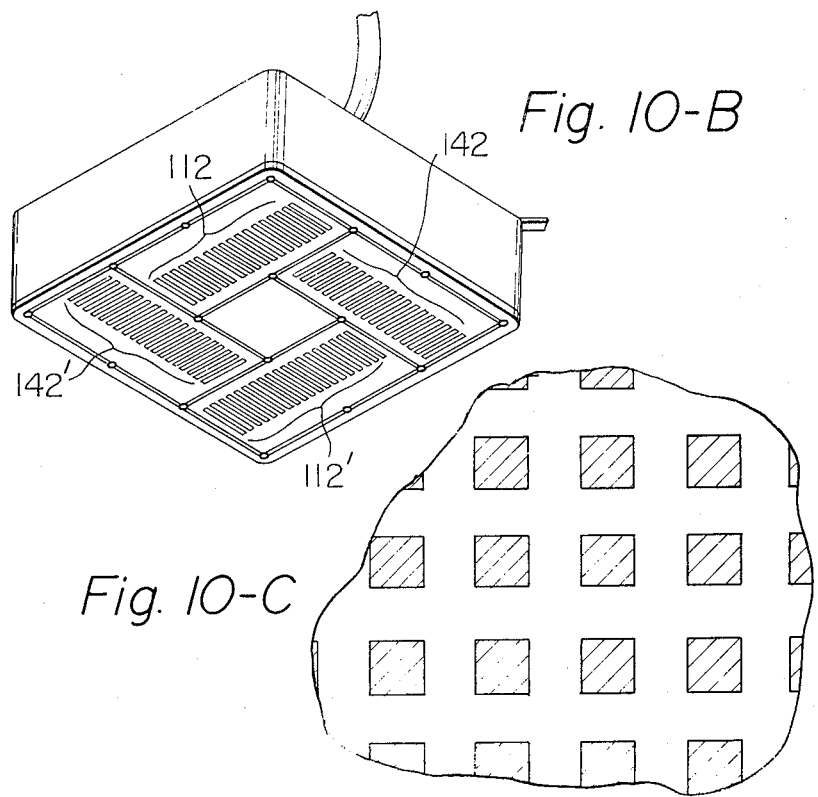

TWO-AXIS MAGNETIC POSITIONING DEVICE

The present invention relates in general, to a two-axis magnetic positioning device by which an object can be transferred in a first direction, a second direction which crosses the first direction, or in any direction between the first and second directions and more particularly, relates to a two-axis magnetic positioning device utilizing a pulse operated linear motor which comprises a first member and a cooperating second member as a stator and a slider, respectively. Said second member can move with constant fine steps in one direction along the surface of said first member. The movement of the second member is electromagnetically controlled in response to command pulses from control circuits. The pulse operated linear motor includes at least one electromagnetic energizing means made of magnetic material surrounded by exciting coils which receives said command pulses and at least one stator made of magnetic material which cooperates electromagnetically with said slider. In addition, said pulse operated linear motor includes means to provide a space between the bottom surface of the second member and the top surface of the first member which acts as a scale. The space prevents direct contact of the two surfaces, although a strong attractive force occurs between them when said exciting coils are energized.

The pulse operated linear motor is utilized in, for example, an automatic manufacturing system which requires fine machining control without manual operation by setting the work on the surface of the second member which is located slightly above the top surface of the first member. In such a manufacturing system, the pulse operated linear motor has the following advantages. When movement in one direction is required, it is usually produced by converting a rotational motion from the conventional electric motor or handle to a rectilinear motion by using a converting means, which may be a feed screw or a similar type of screw. However, in the pulse operated linear motor, no converting means is required as the rectilinear motion is directly produced. Further, it is a well known defect that a converting means such as the feed screw, creates backlash during operation. Obviously, this backlash causes errors, thereby forfeiting high accuracy in manufacturing works. It can easily be recognized, then, that the pulse operated linear motor can be operated with high accuracy because, as mentioned above, converting means such as the feed screw, is not required, thus eliminating creation of backlash. Further, since the converting means is worn away during operation, a manufacturing system including said converting means requires periodic inspection and maintenance. In this respect, the pulse operated motor requires no maintenance because no converting means is involved. In addition, a manufacturing system comprised of the pulse operated linear motor makes almost no noise and can deliver a work with high speed to a desired position. Thus, a work which is set on the second member can be delivered on a horizontal plane to any position according to design. There the work is produced with the desired configuration, hole, threaded hole or groove, by means of cutting tools such as a drill and/or milling cutter which are stationary with regard to the work.

The above-mentioned magnetic positioning has already been realized in several forms. One of the typical forms has been proposed by U.S. Pat. No. Re.27,436 (Original U.S. Pat. No. 3,376,578 dated Apr. 2, 1968, Ser. No. 554,181, May 31, 1966. Application for reissue Mar. 27, 1970, Ser No. 24,060). However, the typical magnetic positioning device has a defect in that its efficiency in converting an input electric power to a driving force is relatively low. This is because, both a first pair of electromagnetical energizing means, each of which is attached to the first and the second member, respectively, and transfers the second member in a first direction, and a second pair of electromagnetical energizing means, each of which is also attached to the first and the second member, respectively, and transfers the second member in a second direction are not separately arranged but are all arranged within the same area.

Therefore, it is a principal object of the present invention to provide a magnetic positioning device composed of a pulse operated linear motor which is highly efficient in converting an input electric power to a driving force, compared to the prior arts, and accordingly, the pulse operated linear motor produces a strong driving force.

The present invention will be more apparent from the ensuing description with reference to the accompanying drawings wherein:

FIGS. 7 through 9 are sectional views of second, third and fourth embodiments according to the present invention, taken along the corresponding line of FIG. 6;

FIG. 10-A is a perspective view of the typical two-axis magnetic positioning device of the prior art, FIG. 10-B is a perspective view of the bottom of a second member and;

FIG. 10-C is an enlarged plan view of a part of the top surface C in FIG. 10-A of a first member.

Figure 1A:
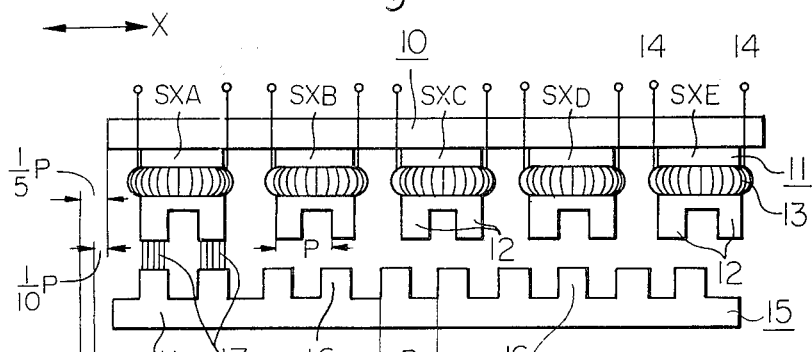
FIGS. 1A, 1B, 1C and 1E are enlarged side views illustrating the principle with respect to a moving action of a pulse operated linear motor.
Figure 1B:
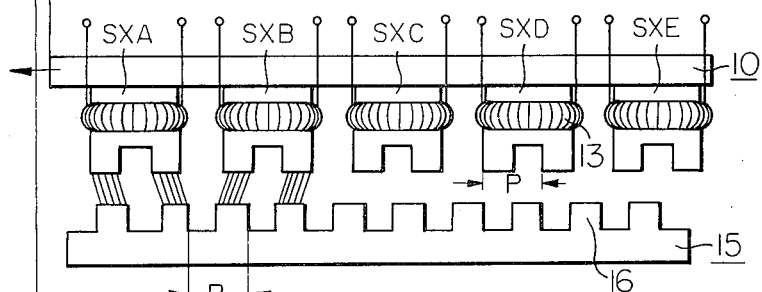
Figure 1C:
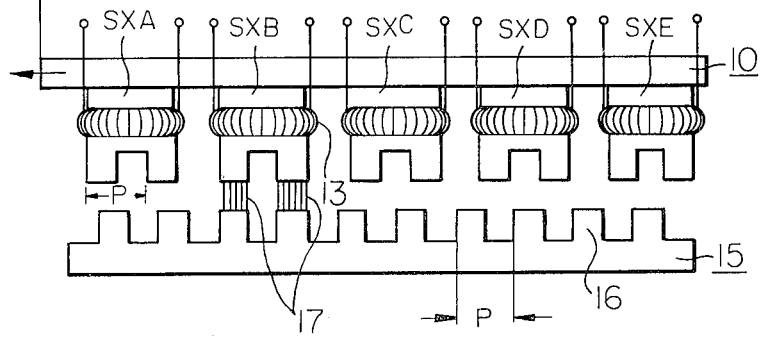
Figure 2:
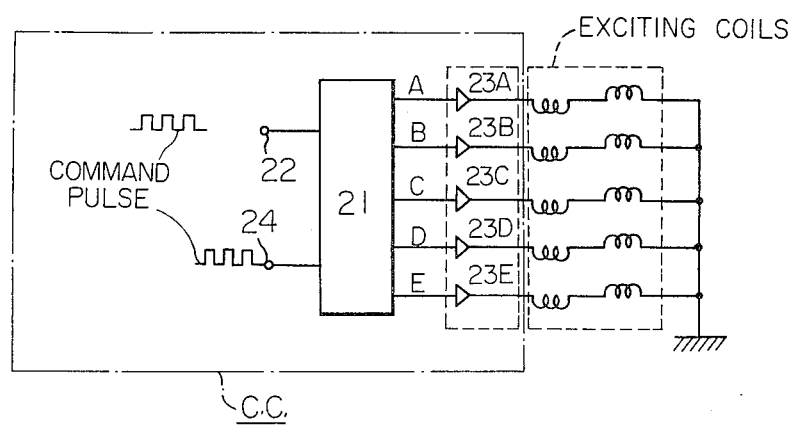
FIG. 2 is a block diagram of a control circuit.

The principle with respect to the moving action of the pulse operated linear motor will be described with reference to FIGS. 1A, 1B and 1C. In FIGS. 1A, 1B and 1C, 10 designates an X-slider to which X-slider elements SXA, SXB, SXC, SXD and SXE, made of magnetic materials, are attached and the second member consists of X-slider 10 and X-slider elements and moves by sequentially energizing the X-slider elements, in the first direction along the X-axis which is indicated at the top left of FIG. 1A. Each X-slider element is comprised of a pole piece 11 to which a plurality of X-slider teeth 12 are attached and X-exciting coils 13 which surround the pole piece 11. Each terminal 14 of X-exciting coils 13 is connected to the control circuit C.C. (FIG. 2). The control circuit choses a sequence by which each exciting coil is energized. The reference numeral 15 designates an X-stator; that is, a scale, to which X-stator teeth 16 are attached and both of which constitute said first member. These X-stator teeth 16 are arranged in a first direction along the X-axis at a predetermined pitch "P" and each tooth 16 extends in the second direction on a vertical plane.

Figure 1D:
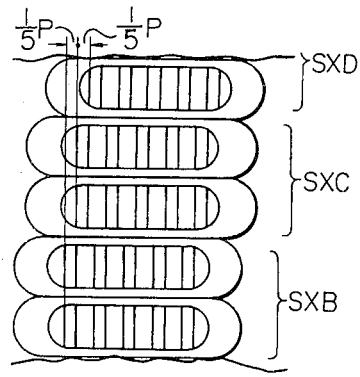
FIG. 1D is a partially enlarged plane view from the bottom of the second member.

The pitch with which the X-slider elements are arranged is selected to be 1/5P when there are five X-slider elements SXA-SXE, wherein the pitch "P" is usually nearly equal to 1 mm. If the X-slider 10 is driven by three X-slider elements SXA, SXB and SXC, said pitch should be ⅓P. The pitch with which the X-slider elements are arranged will be clarified by referring to FIG. 1D, which is a partially enlarged plan view from the bottom showing the configuration of the X-slider elements, that is, the second member.

Figure 1E:
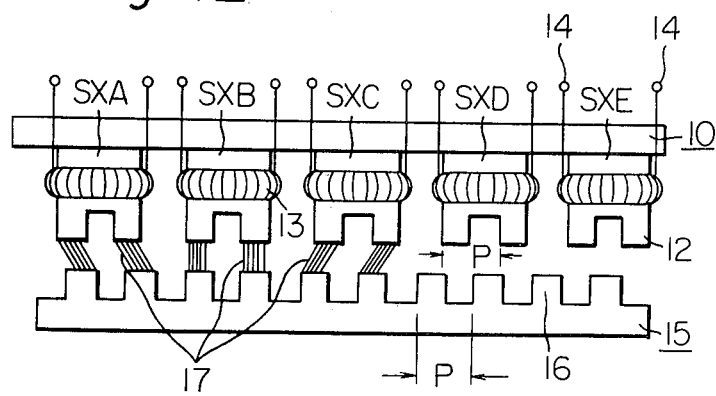
Figure 1F:
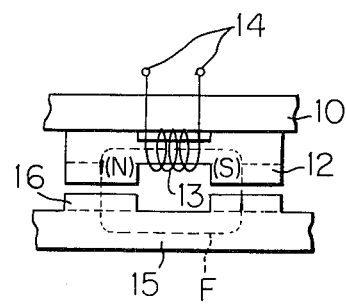
FIG. 1F is a sectional view of a conventional pulse operated linear motor to illustrate the principle of moving.

Moving action is explained as follows. When power amplified command pulses from the output of the control circuit C.C. shown in FIG. 2, are applied to the X-exciting coils 13 attached to the X-slider elements SXA, a magnetic flux path is obtained, indicated by dotted line F in FIG. 1F. North pole N and south pole S are created as shown in FIG. 1F, whereby an attracting force occurs between the pair of X-slider teeth of the X-slider element SXA and a pair of cooperating stator teeth 16. This attractive force is depicted by parallel lines 17 in FIG. 1A. The X-slider element SXA, and accordingly, the X-slider 10, move to a position where the center portion of the X-slider teeth 12 coincides with the center portion of the adjacent X-stator teeth 16. Next, two separate power amplified command pulses from the output of the control circuit C.C. are applied to the X-exciting coils 13 attached to the X-slider element SXA and to the X-exciting coils 13 attached to the X-slider element SXB. Two attracting forces occur which are depicted by the two groups of parallel lines 17 shown in FIG. 1B. The X-slider elements SXA and SXB, and accordingly, the X-slider 10, move to a position where the middle point between the center portions of the slider teeth attached to SXA and SXB coincides with the middle point between the center portions of the two adjacent stator teeth 16. At this time, one step movement of the X-slider 10 along the X-axis direction is obtained and the length of the one step corresponds to 1/10P. In FIG. 1C, if the pitch "P" is selected to be 1 mm, one step becomes 0.1 mm. Next, only the X-exciting coil 13 attached to the X-slider element SXB is energized and the X-slider element SXB moves to a position where the center portion of the X-slider teeth of SXB coincides with the center portion of the adjacent X-stator teeth 16.

At this time, one step movement, that is 1/10P, of the X-slider 10 is obtained in the same manner as above, with regard to FIG. 1A. Consequently, when the X-exciting coils 13 attached to the X-slider elements SXA — SXE are energized in this order; (SXA) → (SXA, SXB) → (SXB) → (SXB, SXC) → (SXC) → (SXC, SXD) → (SXD) → (SXD, SXE) → (SXE) → (SXE, SXA) the X-slider 10 steps 1/10P with each respective energization along the X-axis. The sequence for energizing the X-exciting coils 13 is not limited to the above-mentioned sequence and orders such as (SXA, SXB) → (SXA, SXB, SXC) → (SXB, SXC) → (SXB, SXC, SXD) → (SXC, → SXD) → (SXC, SXD, SXE) (SXD, SXE), (SXD, SXE, SXA) → (SXE, SXA) (SXE, SXA, SXB) are more preferable in view of increased driving force and reduced vibration during actual operation. The above-mentioned sequence is the so called two-phase – three-phase alternative excitation sequence. Said attractive forces 17 in the three-phase alternative excitation, for example the order (SXA, SXB, SXC), are shown in FIG. 1E.

FIG. 2 is a block diagram of the control circuit C.C. The X-slider element is driven by one control circuit C.C. and the Y-slider element is driven by another control circuit C.C. Both control circuits have the same block diagram shown in FIG. 2. Operation of the control circuit as follows.

Command pulses are applied to exciting controller 21 through the forward input terminal 22. The exciting controller 21 decides energization orders of the X-(Y-) exciting coils of the X-(Y-) slider, and the outputs from the exciting controller 21 excite the selected exciting coils through power amplifiers 23A, 23B . . . , 23E in accordance with said energization orders. In FIG. 2, each set of two reactance elements connected in series, indicates a pair of exciting coils attached to each slider element. When reversed energization orders are required, the command pulses are applied to the reverse input terminal 24.

Figure 3:
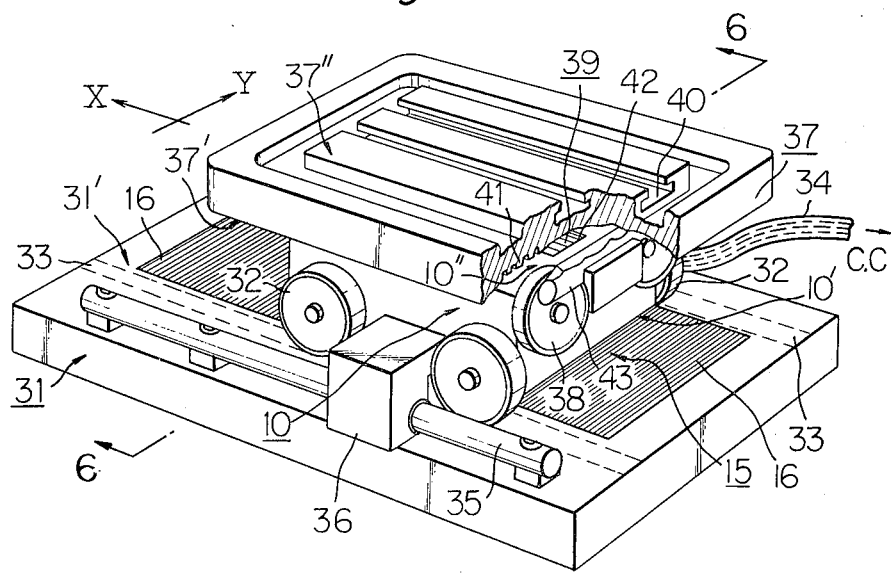
FIG. 3 is a perspective view, partially cut off, showing an embodiment of a pulse operated linear surface motor according to the present invention.
Figure 4:
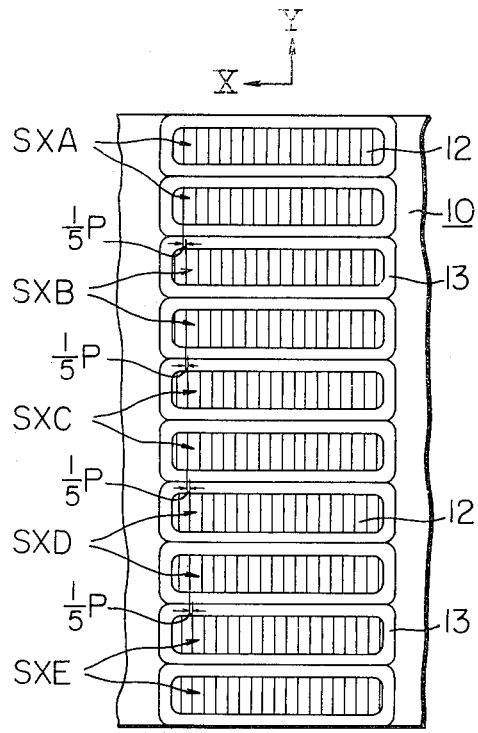
FIGS. 4 and 5 are plan views, partially cut off, showing, respectively, the bottom and the top of an X-slider.

The present invention will now be explained by referring to FIGS. 3 through 9. FIG. 3 is a perspective view, partially cut off, showing a first embodiment according to the present invention. In this Figure, the reference numeral 31 indicates the first member. The first member 31 has the X-stator 15 on its first surface 31'. The X-stator 15 acting as a scale comprises the X-stator teeth 16 which are arranged in the first direction, that is along the X-axis, at a predetermined constant pitch, and each X-stator tooth 16 extends in the second direction, that is along the Y-axis. The reference numeral 10 indicates the second member which is located above the surface 31', that is, the top surfaces of the X-stator teeth 16, and the second member 10 is able to move by means of roller 32 in the first direction (X). The roller 32 which rotates on a rail 33, located on the first surface 31' of the first member 31, together with the second member 10, maintains a constant small air gap between said first surface 31', and a second surface 10' (not shown), that is, the bottom surface of the second member 10. The X-slider elements are arranged on the second surface 10' of the second member 10, which cooperate electromagnetically with the X-stator teeth 16 according to the power amplified command pulses from the control circuit C.C. through feed line 34. The X-slider elements are arranged as shown in FIG. 4 which is an enlarged plan view, partially cut off, of the second surface 10'. In FIG. 4 there are five pairs of X-slider elements SXA, SXB, SXC, SXD and SXE, and each of the X-slider elements has X-slider teeth 12 and exciting coils 13. As can be seen in FIG. 4 each X-slider element SXA – SXE is actually shifted by 1/5P in relation to the adjacent element, in the first direction along the X-axis as previously mentioned with regard to FIG. 1D. When power amplified command pulses from the control circuit C.C. are applied to the exciting coils 13, the X-slider elements SXA – SXD, and accordingly the second member 10, move in the first direction along the X-axis by fine steps with respect to the X-stator 15, that is, the first member 31. The principle regarding the moving action is the same as previously described with reference to FIGS. 1A through 1C. Thus, the second member 10 in FIG. 3 moves to any desired position in the first direction along the X-axis with respect to the first member 31, by the command pulses from the control circuit C.C. During operation, the second member 10 is restricted to movement only in the first direction along the X-axis by means of guide rail 35 which is fixed to the first member 31 and extends in the first direction along the X-axis. In FIG. 3, the second member 10 is illustrated with a guide member 36, slidably connected to the guide rail 35, beside it.

Figure 5:
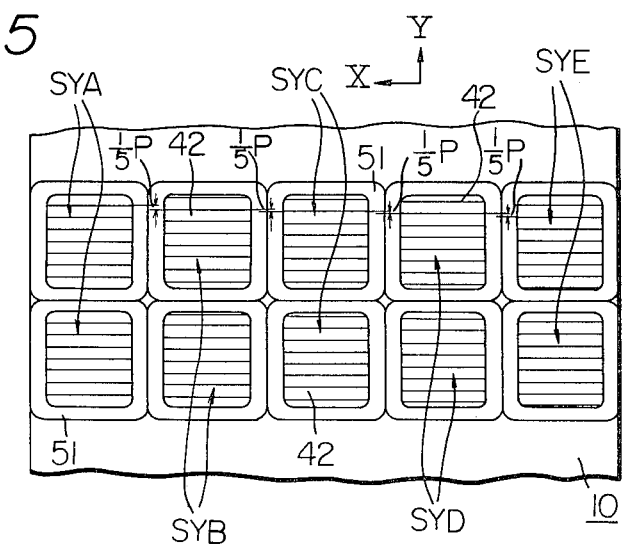

Further, a third member 37 in FIG. 3 is located above a third surface 10'', that is the top surface of the second member 10. The third member 37 is able to move by means of roller 38 in the second direction along the Y-axis. A rail (not shown in FIG. 3 but shown by numeral 61 in FIG. 6) is located on a fourth surface 37', that is the bottom surface of the third member 37 and rides on the roller 38. The roller 38 maintains a constant small air gap between the third surface 10'', and the fourth surface 37'. The third member 37 acts as, for example, a machining table which firmly holds a work piece to be processed on its top surface 37'' by way of T-shaped fixing grooves 40. The Y-stator elements are arranged on the third surface 10'' of the second member 10 as one body, which cooperate electromagnetically with Y-slider teeth 41 according to power amplified command pulses from a control circuit C.C. through feed line 34. In this case, the fourth surface 37' of the third member 37 acts as a scale comprised of Y-slider teeth 41 as shown in FIG. 3. Electromagnetic exciting member, that is exciting coils, are included in the Y-stator 39 which are on the third surface 10''. The Y-stator elements are arranged as shown in FIG. 5 which is an enlarged plan view, partially cut off, of the top surface of the second member 10.

The Y-slider teeth 41 in FIG. 3 are arranged in the same manner as the arrangement of the X-stator teeth 16, wherein the Y-slider teeth 41 are arranged at a predetermined constant pitch in the second direction along the Y-axis and each of the Y-slider teeth 41 extends in the first direction along the X-axis. In FIG. 5, there are five pairs of Y-stator elements SYA, SYB, SYC, SYD and SYE, and each of the Y-stator elements has Y-stator teeth 42 and exciting coils 51. As can be seen in FIG. 5 each Y-stator element is also actually shifted by 1/5P in relation to the adjacent element, in the second direction along the Y-axis as previously mentioned with regard to FIG. 1D. When power amplified command pulses from the control circuit C.C. are applied to the exciting coils, the third member 37 moves in the second direction along the Y-axis by fine steps with respect to the Y-stator 39, that is, the second member 10. The principle regarding the moving action is the same as previously described with reference to FIGS. 1A and 1C. Thus, the command pulses from the control circuit C.C. causes the third member 37 in FIG. 3 to move to any desired position in the second direction along the Y-axis with respect to the second member 10. During operation, the third member 37 is restricted to movement only in the second direction along the Y-axis with respect to the second member 10 by means of guide bar 43 shown in FIG. 3.

Figure 6:
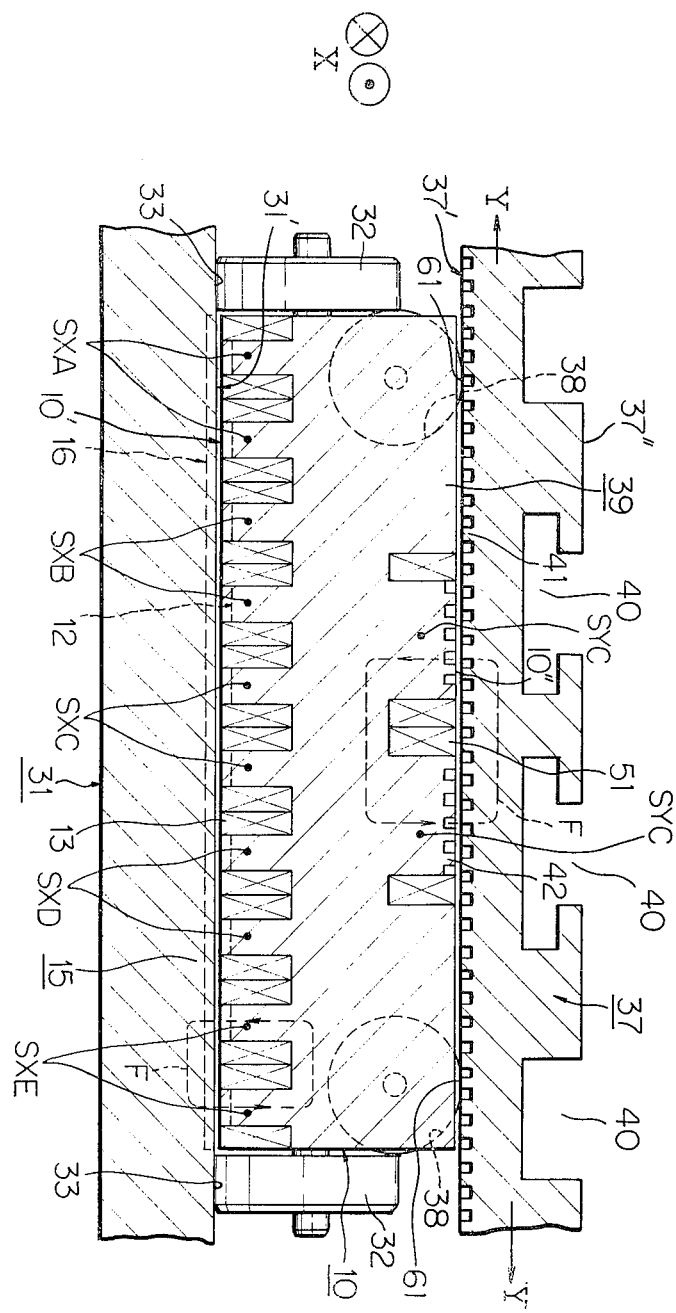
FIG. 6 is a sectional view of a first embodiment according to the present invention taken along line 6—6 of FIG. 3.

The construction of the first embodiment according to the present invention will be clarified by referring to FIG. 6. FIG. 6 is a sectional view taken along the line 6—6 of FIG. 3 through the third member 37, the second member 10 and the first member 31. In FIG. 6, the second member 10 moves above the first member 31 perpendicular to the plane of the drawing in the X-direction, and further, the third member 37 moves above the second member 10 in the Y-direction with respect to the second member 10. Consequently, the work piece to be processed which is set on the top surface 37'' of the third member moves on a horizontal place in the first (X) direction, second (Y) direction or first-second (X–Y) directions with respect to the first member 31. The work piece can be moved smoothly with fine steps, to any position on the horizontal plane.

From the above explanation of the first embodiment according to the present invention it should be noted that the first surface 31' includes only the X-stator teeth 16 and the cooperating second surface 10' includes only the X-slider teeth 12, and includes neither Y-stator teeth nor Y-slider teeth. Because of this, the efficiency for converting an input electric power to transfer the second member 10 together with the third member 37 in the first direction increases compared to that of the prior art. Further, the third surface 10'' includes only the Y-stator teeth 42 and the cooperating fourth surface 37' includes only the Y-slider teeth 41, and includes neither X-stator teeth nor X-slider teeth. As a result, the efficiency for converting an input electric power to transfer the third member 37 with respect to the second member 10 increases compared to that of the prior art. The above-mentioned increase in efficiency will be apparent by referring to FIGS. 10-A, B and C. FIG. 10-A is a perspective view of the typical two-axis magnetic positioning device used for driving chart plotters and other devices. In FIG. 10-A a second member 110 (corresponding to said second member 10) is floated on an air bearing through a pipe $F_p$ over a first member 131 (corresponding to said first member 31) and said second member 110 can move in any direction. In FIG. 10-A there is no third member (previously quoted as numeral 37 in the first embodiment), since the second member 110 in FIG. 10-A has both X-slider teeth 112 (corresponding to said X-slider teeth 12) and Y-slider teeth 142 (corresponding to said Y-stator teeth 42) on its bottom. FIG. 10-B is a plan view of the bottom of the second member 110. The first member 131 has both X-stator teeth and Y-stator teeth on its top surface such as shown in FIG. 10-C. FIG. 10-C is an enlarged plan view of a part of the top surface C in FIG. 10-A of the first member 131. As should be clear from FIG. 10-C the entire hatched area, which is made of magnetic material and acts as X-stator teeth and also Y-stator teeth, is much smaller than that of the present invention.

In the first embodiment of the present invention: a plurality of first teeth made of a magnetic material which are indicated by 16 in FIG. 6, are arranged on the first surface 31' of the first member 31; a plurality of first electromagnetic energizing means which are indicated by SXA – SXE in FIG. 6 are arranged on the second surface 10' of the second member 10; a plurality of second electromagnetic energizing means which are indicated by SYA – SYE in FIG. 5 are arranged on the third surface 10''; and a plurality of second teeth, (indicated by 41 in FIG. 6), are made of a magnetic material and are arranged on the fourth surface 37' of the third member 37.

FIG. 7 is a sectional view of the second embodiment according to the present invention. In FIG. 7: a plurality of first teeth 16' made of a magnetic material are arranged on the second surface 10' of the second member 10; a plurality of first electromagnetic energizing means which are indicated by the letters SXA', SXB', SXC', SXD' and SXE' are arranged on the first surface 31' of the first member 31; a plurality of second electromagnetic energizing means, one of which is indicated by SYC as indicated in FIG. 6, are arranged on the third surface 10'' of the second member 10, and; a plurality of second teeth (indicated by 41 in FIG. 7), are made of a magnetic material and are arranged on the fourth surface 37' of the third member 37.

FIG. 8 is a sectional view of the third embodiment according to the present invention. In FIG. 8: a plurality of first teeth, (indicated by 16 in FIG. 8), are made of a magnetic material and are arranged on the first surface 31' of the first member 31; a plurality of first electromagnetic energizing means which are indicated by SXA – SXE in FIG. 8 are arranged on the second surface 10' of the second member 10; a plurality of second energizing means, one of which is indicated by the letters SYC' in FIG. 8, are arranged on the fourth surface 37' of the third member 37, and; a plurality of second teeth made of magnetic material which are indicated by 41' in FIG. 8 are arranged on the third surface 10'' of the second member 10.

FIG. 9 is a sectional view of the fourth embodiment according to the present invention. In FIG. 9; a plurality of first teeth, (indicated by 16' in FIG. 9), are made of magnetic material and are arranged on the second surface 10' of the second member 10; a plurality of first electromagnetic energizing means, one of which is indicated by the letters SXC' in FIG. 9, are arranged on the first surface 31' of the first member 31; a plurality of second electromagnetic energizing means which are indicated by the letters SYA', SYB', SYC', SYD' and SYE' in FIG. 9, are arranged on the fourth surface 37' of the third member 37, and; a plurality of second teeth made of magnetic material which are indicated by 41 in FIG. 9, are arranged on the third surface 10'' of the second member 10.

The above-mentioned second, third and fourth embodiments also have the same advantage of increased efficiency as that of the first embodiment. This is because a plurality of first teeth and a cooperating plurality of first electromagnetic energizing means are located on one horizontal plane, which drives an object set on the third member in the first direction. A plurality of second teeth and a cooperating plurality of second electromagnetic energizing means are located on another horizontal plane, which drive the object in the second direction. In addition, the first embodiment has another advantage in that the structure is simple and can be manufactured easily. This is because, mechanical driving units using for example the rollers 32 and 38, and electromagnetic energizing means using for example the exciting coils 13 and 51 and driving elements SXA – SXE and SYA – SYE, which require highly skilled labor and accurate manufacturing, are concentrated on only the second member 10. On the other hand, other members, that is first member 31 and third member 37, are easily manufactured, since these members are provided only with simple first teeth 16 and simple second teeth 41.

What is claimed is:

1. A two-axis magnetic positioning device comprised of pulse operated linear motors including:
   a first member having a first surface;
   a second member of which the bottom forms a second surface and the top forms a third surface, which can move in a first direction with respect to the first member keeping a small air gap between said first surface and said second surface;
   a third member having a fourth surface, which can move in a second direction which crosses the first direction with respect to the second member keeping a small air gap between said third surface and said fourth surface; wherein
   one of the first and second surfaces being provided with a plurality of first teeth made of a magnetic material which are arranged in the first direction with a constant pitch "P," and each first tooth extends in a direction which is not parallel to the first direction; the other first surface or second surface comprises N number of first electromagnetic energizing means which drive the second member in the first direction with respect to the first member by electromagnetically cooperating with said first teeth wherein each first electromagnetic energizing means has a plurality of pairs of first driving teeth which are surrounded by exciting coils and are arranged in the first direction with the constant pitch "P" and each of the first driving teeth extends in the direction in which each first tooth is arranged and further, each of the first driving teeth of one of the first electromagnetic energizing means is shifted by (1/N)P in relation to each of the first driving teeth of the adjacent members of the first electromagnetic energizing means,
   one of the third and fourth surfaces being provided with a plurality of second teeth made of a magnetic material which are arranged in the second direction with a constant pitch "P'," and each second tooth extends in a direction which is not parallel to the second direction; the other of the third surface or the fourth surface comprises N' number of second electromagnetic energizing means which drive the third member in the second direction with respect to the second member by electromagnetically cooperating with said second teeth wherein each second electromagnetic energizing means has a plurality of pairs of second driving teeth which are surrounded by exciting coils and are arranged in the second direction with the constant pitch "P'" and each of the second driving teeth extends in the direction in which each second tooth is arranged and further, each of the second driving teeth of one of the second electromagnetic energizing means is shifted by (1/N')P' in relation to each of the second driving teeth of the adjacent members of the second electromagnetic energizing means.

2. A two-axis magnetic positioning device as set forth in claim 1, wherein said first surface comprises a plurality of said first teeth made of a magnetic material,
   said second surface comprises N number of first electromagnetic energizing means,
   said third surface comprises N' number of second electromagnetic energizing means, and said fourth surface comprises a plurality of said second teeth made of a magnetic material.

3. A two-axis magnetic positioning device as set forth in claim 1, wherein said first surface comprises N number of first electromagnetic energizing means,
   said second surface comprises a plurality of said first teeth made of a magnetic material, said third surface comprises N' number of second electromagnetic energizing means, and said fourth surface comprises a plurality of said second teeth made of a magnetic material.

4. A two-axis magnetic positioning device as set forth in claim 1, wherein said first surface comprises a plurality of said first teeth made of a magnetic material, said second surface comprises N number of first electromagnetic energizing means, said third surface comprises a plurality of said second teeth made of a magnetic material, and said fourth surface comprises N' number of second electromagnetic energizing means.

5. A two-axis magnetic positioning device as set forth in claim 1, wherein said first surface comprises N number of first electromagnetic energizing means, said second surface comprises a plurality of said first teeth made of a magnetic material, said third surface comprises a plurality of said second teeth made of a magnetic material, and said fourth surface comprises N' number of second electromagnetic energizing means.

* * * * *